Oct. 4, 1960  C. A. RICH, JR  2,955,001
BEARING
Filed Dec. 30, 1957
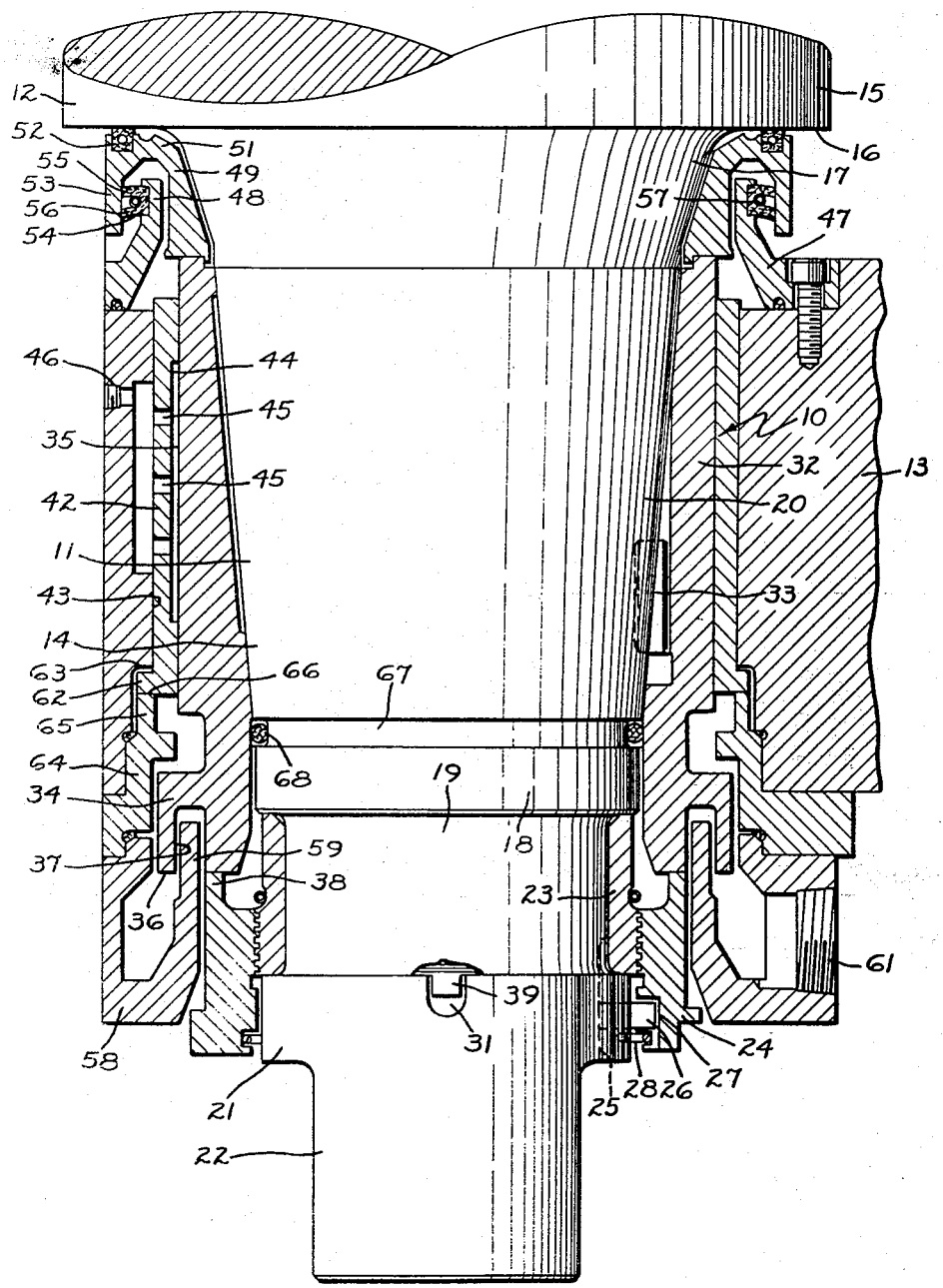
INVENTOR.
Charles A. Rich Jr.
BY
Norman S. Blodgett
Attorney

2,955,001
BEARING

Charles A. Rich, Jr., Southboro, Mass., assignor to Morgan Construction Company, Worcester, Mass., a corporation of Massachusetts Filed Dec. 30, 1957, Ser. No. 706,101

4 Claims. (Cl. 308—36.1)

This invention relates to a bearing and more particularly to the construction and arrangement of a bearing for use with the roll neck of a vertical rolling mill.

In the rolling of ferrous metals, it is desirable on occasion to provide a rolling mill stand in which the rolls are mounted with their axes vertical. It has been recognized for some time that it would be desirable to provide such rolls with oil-film bearings of the type shown and described in the patent of Dahlstrom, No. 2,018,055. However, attempts to apply such bearings to the roll necks of vertical rolls have not been altogether successful, because of difficulties in the retaining of lubricant in the bearing, and also because of certain sealing problems. These and other difficulties experienced with the prior art devices have been obviated in a novel manner by the present invention.

It is, therefore, an outstanding object of the present invention to provide an oil-film bearing for use on the roll necks of rolls of a vertical rolling mill.

It is another object of this invention to provide an oil-film bearing for use with the lower roll neck of a roll of a vertical rolling mill, wherein the loss of lubricant is reduced to a minimum.

A still further object of the invention is the provision of an oil-film bearing for the lower roll necks of a vertical rolling mill which is simple and inexpensive to manufacture, is capable of a long life of useful service, and in which maintenance and removal of the bearing is greatly simplified.

With these and other objects in view, as will be apparent to those skilled in the art, the invention resides in the combination of parts set forth in the specification and covered by the claims appended hereto.

The character of the invention may be best understood by reference to one of its structural forms, as illustrated by the accompanying drawing in which the single figure is a vertical sectional view of a vertical rolling mill bearing embodying the principles of the present invention.

Referring to the drawing, it can be seen that the bearing, designated generally by the reference numeral 10, is mounted on the roll neck 11 of the roll 12 of a vertical rolling mill. The bearing 10 is mounted in and surrounded by a chock 13 which is mounted in the usual way in the frame of a vertical rolling mill, not shown. As is evident in the drawing, the roll neck 11 is the one which is lowermost in the rolling mill and it is provided with a substantial tapered portion 14. The roll 12 is provided with an enlarged cylindrical portion 15 in the usual manner. The cylindrical portion terminates in a radial shoulder 16 which is joined to the tapered portion 14 by a transition portion 17. At its lower end the tapered portion 14 merges into a short cylindrical portion 18, at the lower end of which the roll neck is formed with a cylindrical portion 19 of considerably reduced diameter. Below the cylindrical portion 19 the roll neck formed with another short cylindrical portion 21 of somewhat larger diameter. Below the cylindrical portion 21 the roll neck is formed with the usual wobbler 22. In the angular groove formed by the cylindrical portion 19 and the shoulders of the cylindrical portion 18 and 21 resides a threaded member 23 which is formed in two halves to permit it to be placed in the groove. The outer surface of the threaded member 23 is formed with a coarse thread and on this thread is mounted a locknut 24. The lower neck in the vicinity of the cylindrical portion 21 is provided with an axial keyway 25 in which resides a locknut key 26; the key also cooperates with a matching keyway 27 formed in the inner portion of the locknut 24. A suitable key retainer 28 prevents the key from being removed from its keyway during normal operation. It should be noted that the threaded member 23 is provided with a tongue 39 which engages a short keyway 31 formed in the surface of the roll neck in the cylindrical portion 21 thereof.

A sleeve 32 is provided with a tapered internal bore adapted to fit snugly over the tapered portion 14 of the roll neck and a roll type key 33 is provided to prevent rotation of the sleeve 32 relative to the roll neck. The sleeve 32 is provided with an extension 34 which extends concentrically of the cylindrical portion 18 and is also concentric with the upper part of the cylindrical portion 19. The sleeve 32 is also provided with a cylindrical outer surface 35 while the tubular extension 34 is provided with a radial end 36 having a deep annular groove 37 formed therein. The upper end of the nut 24 is provided with a narrow tubular flange 38 which normally presses against the end 36 of the sleeve 32 to retain it in place.

Overlying and surrounding the cylindrical surface 35 of the sleeve 32 is a bushing 42 which resides in a bore 43 formed in the chock 13. The inner bore of the bushing 42 is formed with a shallow pocket 44 joined by ports 45 to an admitting passage 46 formed in the chock. Bolted to the upper end of the chock adjacent to shoulder 16 is an inboard end plate 47 having a tubular flange 48 which extends axially of the roll in the direction of the shoulder 16. Bolted to the upper end of the sleeve 32 is a sleeve extension 49 having an inner bore which closely follows the transition surface 17. The sleeve extension then curves around to form a radially extending portion 51 which lies adjacent the shoulder 16 and is provided with a sleeve packing 52 which is firmly fixed to the extension and is slidably movable over the surface of the shoulder 16. At the outermost portion of this radial portion 51 is a tubular flange 53 which extends axially of the roll away from the shoulder to a point such that a considerable portion of the flange 53 is concentric and co-extensive with the flange 48 of the inboard end plate 47. The outer surface of the flange 48 is provided with an annular groove in which is firmly fixed an external oil seal 54. The oil seal is provided with two outwardly extending flanges 55 and 56 which engage the inner surface of the flange 53 slidably and resiliently. Between the flanges 55 and 56 is placed a metallic garter spring 57 which serves to retain the seal in place. Adjacent the other end of the roll neck the chock 13 is provided a collector housing 58 having a tubular flange 59 which extends axially of the roll and lies well within the deep groove 37 formed in the extension 34 of the sleeve 32. The collector housing 58 is provided with a threaded port 61 adapted to be connected to a conduit to return oil to the sump of the bearing lubrication system. The passage 46 in the chock is similarly adapted to receive the lubricant for the bearing.

The lower end of the bushing 42 is provided with a radially extending flange 62 which extends into a counter bore 63 found in the inner bore 43 of the chock 13. A portion 64 of the chock 13 is provided with a tubular extension 65 having an upper horizontal end surface 66 on which the flange 62 of the bushing 42 normally rests. It should be noted that the portion 64 and the collector housing 58 are removable from the main body of the chock 13 and that they are suitably interconnected with means for preventing fluid leakage therebetween.

An annular groove 67 is formed in the portion of the roll neck between the tapered portion 20 and the cylindrical portion 18; a suitable oil ring 68 lies in this groove and is tightly compressed between the roll neck and the sleeve 32.

It is obvious that minor changes may be made in the form and construction of the invention without departing from the material spirit thereof. It is not, however, desired to confine the invention to the exact form herein shown and described but it is desired to include all such as properly come within the scope claimed.

The invention having been thus described, what is claimed as new and desired to secure by Letters Patent is:

1. A bearing for a lower roll neck of a vertical rolling mill, wherein the roll neck is tapered and terminates in a radial shoulder, comprising a sleeve having a tapered bore for mounting on the roll neck, an outer cylindrical surface, and an end adjacent the shoulder of the roll neck, a bushing loosely surrounding the sleeve, a chock in which the bushing is mounted, means for introducing lubricating fluid between the bushing and sleeve for the maintenance during operation of a hydrodynamic film, the chock having a lubricant-collecting housing located adjacent the other end of the roll neck, passages extending from the ends of the sleeve to the housing, a sleeve extension located adjacent the said shoulder and having a tubular flange extending around the roll and extending in the direction away from the shoulder, a chock having a tubular flange which is concentric with and spaced from the said flange of the sleeve extension, and an external oil seal extending between the two flanges.

2. A bearing for a lower roll neck of a vertical rolling mill, wherein the roll neck is tapered and terminates in a radial shoulder, comprising a sleeve having a tapered bore for mounting on the roll neck, an outer cylindrical surface, and an end adjacent the shoulder of the roll neck, a bushing loosely surrounding the sleeve, a chock in which the bushing is mounted, means for introducing lubricating fluid between the bushing and sleeve for the maintenance during operation of a hydrodynamic film, the chock having a lubricant-collecting housing located adjacent the other end of the roll neck, passages extending from the ends of the sleeve to the housing, a sleeve extension located adjacent the said shoulder and having a tubular flange extending around the roll and extending in the direction away from the shoulder, the chock having a tubular flange which is concentric with and spaced from the said flange of the sleeve extension, and an external oil seal extending between the two flanges, the said oil seal being fastened to the said flange of the chock and having two annular flanges extending radially toward the flange of the sleeve extension for sliding engagement therewith.

3. A bearing for a lower roll neck of a vertical rolling mill, wherein the roll neck is tapered and terminates in a radial shoulder, comprising a sleeve having a tapered bore for mounting on the roll neck, an outer cylindrical surface, and an end adjacent the shoulder of the roll neck, a bushing loosely surrounding the sleeve, a chock in which the bushing is mounted, means for introducing lubricating fluid between the bushing and sleeve for the maintenance during operation of a hydrodynamic film, the chock having a lubricant-collecting housing located adjacent the other end of the roll neck, passages extending from the ends of the sleeve to the housing, the chock having a cylindrical tubular flange extending axially of the roll toward the sleeve at the end away from the shoulder, the flange being generally aligned with the outer surface of the sleeve, and a groove in the sleeve embracing the said flange, a sleeve extension located adjacent the said shoulder and having a tubular flange extending around the roll and extending in the direction away from the shoulder, the chock having a tubular flange which is concentric with and spaced from the said flange of the sleeve extension, and an external oil seal extending between the two flanges, the said oil seal being fastened to the said flange of the chock and having two annular flanges extending radially toward the flange of the sleeve extension for sliding engagement therewith.

4. A bearing for a roll neck of a vertical rolling mill wherein the roll neck terminates in a radial shoulder, comprising a sleeve having a bore for mounting on the roll neck, an outer cylindrical surface, and an end adjacent the shoulder of the roll neck, a bushing loosely surrounding the sleeve, a chock in which the bushing is mounted, means for introducing lubricating fluid between the bushing and sleeve for the maintenance during operation of a hydro-dynamic film, the chock having a lubricant-collecting housing located adjacent the other end of the roll neck, a passage extending from the end of the sleeve to the housing, a sleeve extension located adjacent the said shoulder and having a tubular flange extending around the roll and extending in the direction away from the shoulder, the chock having a tubular flange which is concentric with and spaced from the said flange of the sleeve extension, and an external oil seal extending between the two flanges.

References Cited in the file of this patent

UNITED STATES PATENTS

| 1,701,010 | Nystrom | Feb. 5, 1929 |
| 1,820,017 | Faulks | Aug. 25, 1931 |
| 2,018,055 | Dahlstrom | Oct. 22, 1935 |
| 2,328,676 | Rich | Sept. 7, 1943 |

FOREIGN PATENTS

| 617,253 | Germany | Aug. 15, 1935 |